US010235530B2

(12) United States Patent
Dryfoos et al.

(10) Patent No.: US 10,235,530 B2
(45) Date of Patent: Mar. 19, 2019

(54) PROTECTING SENSITIVE INFORMATION WHEN REPLICATING DATA TO REMOTE SYSTEMS

(71) Applicant: International Business Machines Corporation, Armonk, NY (US)

(72) Inventors: Robert O. Dryfoos, New Canaan, CT (US); Christopher D. Filachek, Lagrangeville, NY (US); Bradd A. Kadlecik, Pleasant Valley, NY (US); Colette A. Manoni, Brewster, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 15/197,991

(22) Filed: Jun. 30, 2016

(65) Prior Publication Data
US 2018/0004968 A1    Jan. 4, 2018

(51) Int. Cl.
*G06F 21/00*   (2013.01)
*G06F 21/62*   (2013.01)
*G06F 17/30*   (2006.01)
*H04L 29/08*   (2006.01)

(52) U.S. Cl.
CPC .... *G06F 21/6218* (2013.01); *G06F 17/30575* (2013.01); *G06F 21/6227* (2013.01); *H04L 67/1095* (2013.01); *G06F 2221/2141* (2013.01)

(58) Field of Classification Search
CPC ................ G06F 21/6218; G06F 17/30575
USPC ...................................................... 726/26–30
See application file for complete search history.

(56) References Cited

U.S. PATENT DOCUMENTS

| 6,792,540  | B1  | 9/2004  | Smith et al. |
| 7,158,990  | B1* | 1/2007  | Guo .................... G06F 17/2247 |
| 9,454,671  | B2  | 9/2016  | Engberg et al. |
| 9,641,599  | B2  | 5/2017  | Wesley et al. |
| 2005/0203946 | A1 | 9/2005 | Pauly et al. |
| 2015/0371056 | A1 | 12/2015 | Sivaramamurthy et al. |
| 2016/0078245 | A1* | 3/2016 | Amarendran ....... G06F 21/6218 713/193 |

OTHER PUBLICATIONS

"File Migration and Consolidation",Data Dynamics Inc., Retrieved from the internet:, URL:http://www.datadynamicsinc.com/products/storagex-plafform/file-migra . . . , Apr. 2016, 2 pages.

(Continued)

*Primary Examiner* — Anthony D Brown
(74) *Attorney, Agent, or Firm* — Cantor Colburn LLP; Teddi Maranzano

(57) ABSTRACT

Techniques are provided for replicating database contents to network-enabled remote systems, and limiting such replication with respect to sensitive database contents. An indication is received that a subset of record fields in a database comprise sensitive data. The subset of indicated record fields are flagged based on the received indication. At least a portion of the database is replicated to multiple remote systems, such that for at least a first of the remote systems, data associated with a larger plurality of record fields is provided to the remote system. For at least a second of the remote systems, based on the flagging of the subset of indicated record fields, only data associated with record fields other than the flagged subset is provided to the remote system.

17 Claims, 3 Drawing Sheets

(56) References Cited

OTHER PUBLICATIONS

"Remote Site File Management", Data Dynamics Inc., Retrieved from the internet: URL:http://www.datadynamicsinc.com/products/storagex-plafform/remote-site . . . /storagex-remote, Apr. 2016, 2 pages.

* cited by examiner

```xml
<?xml version="1.0" encoding="utf-8" ?>
<xs:schema xmlns:xs="http://www.w3.org/2001/XMLSchema"
    targetNamespace="http://www.ibm.com/xmlns/prod/ztpf/dfdl/tpfdf/creditCardRecord"
    xmlns:dfdl="http://www.ogf.org/dfdl/dfdl-1.0/"
    xmlns:tddt="http://www.ibm.com/xmlns/prod/ztpf/xml/lib/tpfattributes"
    xmlns:tpfbase="http://www.ibm.com/xmlns/prod/ztpf/dfdl/lib/tpfbase">
    <xs:import namespace="http://www.ibm.com/xmlns/prod/ztpf/dfdl/lib/tpfbase"
        schemaLocation="tpfbase.lib.dfdl.xsd" />
    <xs:annotation>
        <xs:appinfo source="http://www.ogf.org/dfdl/">
            <dfdl:format ref="tpfbase:tpfBaseFmt" />
        </xs:appinfo>
    </xs:annotation>
    <xs:element name="CreditCardRecord">
        <xs:complexType>
            <xs:sequence>
                <xs:element name="PurchasesReference" type="xs:hexBinary" dfdl:length="8" />
                <xs:element name="RCC" type="xs:byte" dfdl:length="1" default="0" />
                <xs:element name="SecurityReference" type="xs:hexBinary" dfdl:length="8" />
                <xs:element name="CreditCardNumber" type="xs:string" dfdl:length="16"
                    tddt:sensitiveinformation="yes" />
                <xs:element name="Flags" type="xs:byte" dfdl:length="1" default="0" />
                <xs:element name="Limit" type="xs:unsignedint" default="0" dfdl:length="4" />
            </xs:sequence>
        </xs:complexType>
    </xs:element>
</xs:schema>
```

FIG. 2

PROTECTING SENSITIVE INFORMATION WHEN REPLICATING DATA TO REMOTE SYSTEMS

BACKGROUND

This disclosure relates to a method, a system and computer program product for performing automated operations for replicating database contents to network-enabled remote systems, and in particular to limiting such replication with respect to sensitive database contents.

It is often advantageous to replicate database contents to remote storage systems, and in particular to enable database manager applications using a network database model to replicate such database contents. The remote systems may use this data for various purposes, including data warehousing, data caching, payments processing, analytics, and other processing. The same data (customer records, as one non-limiting example) may be replicated to several different remote systems. However, the individual remote systems may not need or use all of the received data.

For example, a replicated record for a customer database may include a field for the credit card number used in a customer transaction. A payment processing system may need the credit card number, but other systems focused upon analytics and data caching may not. Moreover, in order to protect customer sensitive information, it may be desirable to replicate credit card numbers or other potentially sensitive information to only those systems that require it.

Various approaches have been used to limit the replication of such sensitive data, but typically utilize custom formats to send subsets of the data to each remote system, where each format only contains the data required for that system. Such approaches may require a unique data format for each remote system targeted for data replication, and are generally inefficient and labor intensive.

Accordingly, it is an object of the present invention to provide a method and system to allow a common format for all remote systems, while avoiding replication of sensitive information to remote systems that do not require or use that information.

SUMMARY

According to at least one embodiment, a method implemented by one or more computing systems configured to manage a database is provided. The method comprises automated operations that include receiving an indication that one or more record fields in a database comprise sensitive data, where the indicated record fields are a subset of a larger plurality of record fields in the database. The automated operations further include flagging, based at least in part on the received indication, the subset of one or more indicated record fields; and replicating at least a portion of the database to multiple remote systems. For at least a first of the multiple remote systems, replicating the portion of the database includes providing data associated with the larger plurality of record fields. For at least a second of the multiple remote systems, replicating the portion of the database includes (based at least in part on the flagging of the subset of indicated record fields) providing to the remote system data associated only with record fields other than the flagged subset.

According to another embodiment, a non-transitory computer-readable storage medium has stored contents that, when executed, configures a computing system to perform automated operations that include receiving an indication that one or more record fields in a database comprise sensitive data, where the indicated record fields are a subset of a larger plurality of record fields in the database. The automated operations further include flagging, based at least in part on the received indication, the subset of one or more indicated record fields; and replicating at least a portion of the database to multiple remote systems. For at least a first of the multiple remote systems, replicating the portion of the database includes providing data associated with the larger plurality of record fields. For at least a second of the multiple remote systems, replicating the portion of the database includes (based at least in part on the flagging of the subset of indicated record fields) providing to the remote system data associated only with record fields other than the flagged subset.

According to another embodiment, a computing system comprises one or more processors and at least one memory that includes instructions that, upon execution by a processor, cause the computing system to perform automated operations that include receiving an indication that one or more record fields in a database comprise sensitive data, where the indicated record fields are a subset of a larger plurality of record fields in the database. The automated operations further include flagging, based at least in part on the received indication, the subset of one or more indicated record fields; and replicating at least a portion of the database to multiple remote systems. For at least a first of the multiple remote systems, replicating the portion of the database includes providing data associated with the larger plurality of record fields. For at least a second of the multiple remote systems, replicating the portion of the database includes (based at least in part on the flagging of the subset of indicated record fields) providing to the remote system data associated only with record fields other than the flagged subset.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

FIG. 2 illustrates a portion of exemplary syntactical definition constructed in accordance with an embodiment.

DETAILED DESCRIPTION

Figure 1:
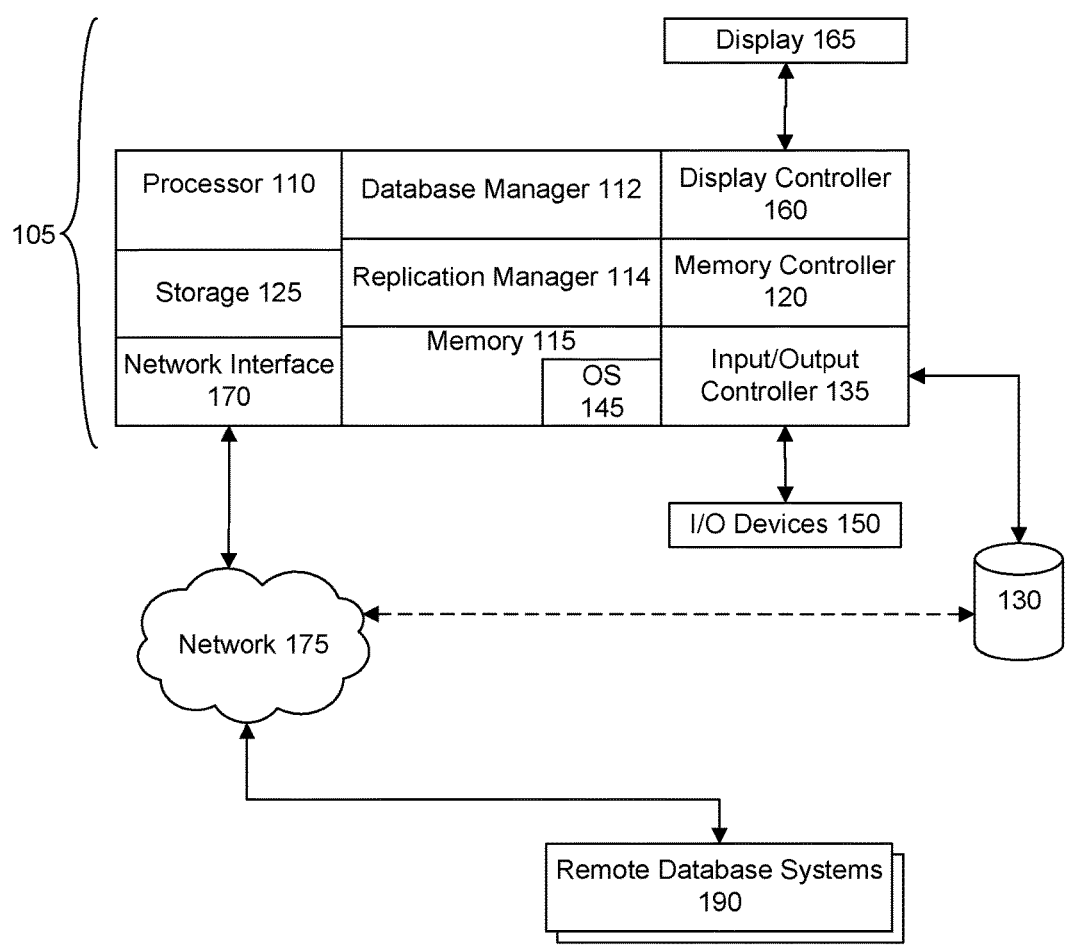
FIG. 1 depicts a block diagram of an exemplary network environment and computing system in accordance with an embodiment.

One or more embodiments described herein enable one or more processor-based computing systems to automatically replicate database contents to network-enabled remote systems while limiting the replication of sensitive database contents. The described techniques may therefore protect the distribution of sensitive data while still enabling replication to multiple remote systems in a simplified manner.

As used herein, the terms "field" or "record fields" refers to any named item or element in a database having a defined type and stored within individual records of the database. The terms "record" or "database record," also as used herein, may refer to any implicitly structured data item in a database or table that includes one or more fields.

In at least some embodiments, a database manager (e.g., a NoSQL database manager such as z/TPFDF or other database manager) may augment the metadata for data in a managed database to define individual record fields or groups of such fields with one or more "sensitive data" attributes. As one example, a subset of record fields in the database may be flagged with a Boolean "sensitive" attribute, such that each record field in the database is associated with either a positive or negative value ("0" or "1", "n" or "y", etc.) for the attribute. As another example, a subset of record fields may be assigned another type of "sensitive" attribute, such as one or more attributes that support more than a binary set of values or otherwise defines classes of sensitive information. For example, financial information such as credit card numbers and bank account numbers could be indicated via one class or attribute, while contact information such as email addresses, home addresses, and phone numbers could be indicated via another class or attribute. In certain situations, a single record field may be assigned more than one type of sensitive attribute.

It will be appreciated that while descriptions herein may typically discuss the attribute as "sensitive," other uses or status descriptions may be used for attributes to distinguish whether particular remote systems are to receive replicated data from record fields associated with those particular attributes.

In certain embodiments, each remote system to which the database manager sends or otherwise provides replicated data from the database may be defined in a manner to indicate whether the remote system is to receive data from record fields associated with a "sensitive" attribute. For databases in which a Boolean "sensitive" attribute is used, for example, each remote system may also be flagged with a Boolean "sensitive" attribute. In this manner, remote systems associated with a positive value for the Boolean "sensitive" attribute are indicated to receive data from "sensitive" record fields, while remote systems associated with a negative value for the Boolean "sensitive" attribute are indicated not to receive such data. Remote systems may be assigned qualifying "sensitive" attributes corresponding to whatever "sensitive" attributes are assigned to record fields within the metadata of a particular database that is to be replicated to those remote systems. Classes or attributes assigned to remote systems for replication match sensitive information classes defined for record fields in the database to be replicated to those remote systems. In at least one embodiment, remote systems may be allowed to receive multiple classes of sensitive information. For example, a payment processing system may be allowed to receive financial information as well as contact information, and therefore may be assigned positive values for both types of attributes.

In either scenario, when data is collected by the database manager for replication, sensitive data fields (i.e., data stored in record fields attributed as "sensitive") are only sent to remote systems that are indicated as permitted to receive such sensitive data fields. In contrast, record fields that are not marked as "sensitive" would be sent to all remote systems receiving replicated data from the database.

FIG. 1 illustrates a block diagram of a networked computing system 100 for use in practicing the teachings herein. The methods described herein can be performed or otherwise implemented via hardware, software (e.g., firmware), or combination thereof. In an exemplary embodiment, the methods described herein are implemented in hardware, and may be part of the microprocessor of a special or general-purpose digital computer, such as a personal computer, workstation, minicomputer, or mainframe computer. The computing system 100 therefore includes computer 105.

In the illustrated embodiment of FIG. 1, the computer 105 includes a processor 110, a database manager module 112, a data replication manager 114, a memory 115 coupled to a memory controller 120, internal storage 125, and one or more input and/or output (I/O) devices 150 that are communicatively coupled to the computer 105 via a local input/output controller 135, which in the illustrated embodiment is further communicatively coupled to external storage 130. The input/output controller 135 may include one or more buses or other wired or wireless connections, as is known in the art. The input/output controller 135 may further include additional elements, which are omitted for simplicity, such as controllers, buffers (caches), drivers, repeaters, and receivers, to facilitate communications. Further, the local interface may include address, control, and/or data connections to facilitate appropriate communications among the aforementioned components.

Also in the illustrated embodiment, the processor 110 is a hardware device for executing hardware instructions or software, particularly that stored in memory 115. The processor 110 can be any custom made or commercially available processor, a central processing unit (CPU), an auxiliary processor among several processors associated with the general-purpose computer 105, a semiconductor based microprocessor (in the form of a microchip or chip set), a macroprocessor, or generally any device for executing instructions.

The memory 115 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the processor 110.

The instructions in the memory 115 may include one or more separate programs, each of which comprises an ordered listing of executable instructions for implementing logical functions. In the example of FIG. 1, the instructions in the memory 115 include a suitable operating system (OS) 145. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via input/output controller 135. In the depicted embodiment, the computing system 100 further includes a display controller 160 coupled to a display 165, and a network interface 170 communicatively coupled to multiple remote database client systems 190 via a network 175.

The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN) a personal area network (PAN), a virtual private network (VPN), intranet or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the processor 110 is configured to execute instructions stored within the memory 115, to communicate data to and from the memory 115, and to generally control operations of the computer 105 pursuant to the instructions.

In certain embodiments, a database manager may update metadata for individual record fields and on groups of record fields using a variety of syntaxes. In one example, a database manager may update such metadata using a DFDL ("Data Format Description Language") schema, such as by defining a "sensitiveInformation" attribute defined on DFDL elements, complexTypes, or groups.

FIG. 2 illustrates a portion of a database metadata document 200 that includes exemplary XML/DFDL syntax describing a credit card record having an element tag as sensitive information. In particular, the document 200 includes element definition 210 ("xs:element" having a name of "CreditCardRecord") that includes attribute assignment 220, indicating a field "type" of "string", a field "length" of "16", and a value of "yes" to a defined Boolean attribute entitled "sensitiveInformation". In this manner, the database metadata document 200 indicates that the CreditCardRecord field element is sensitive and will not be replicated to remote data systems that are not flagged to receive data in fields having a value of "yes" for the "sensitive Information" attribute.

Figure 3:
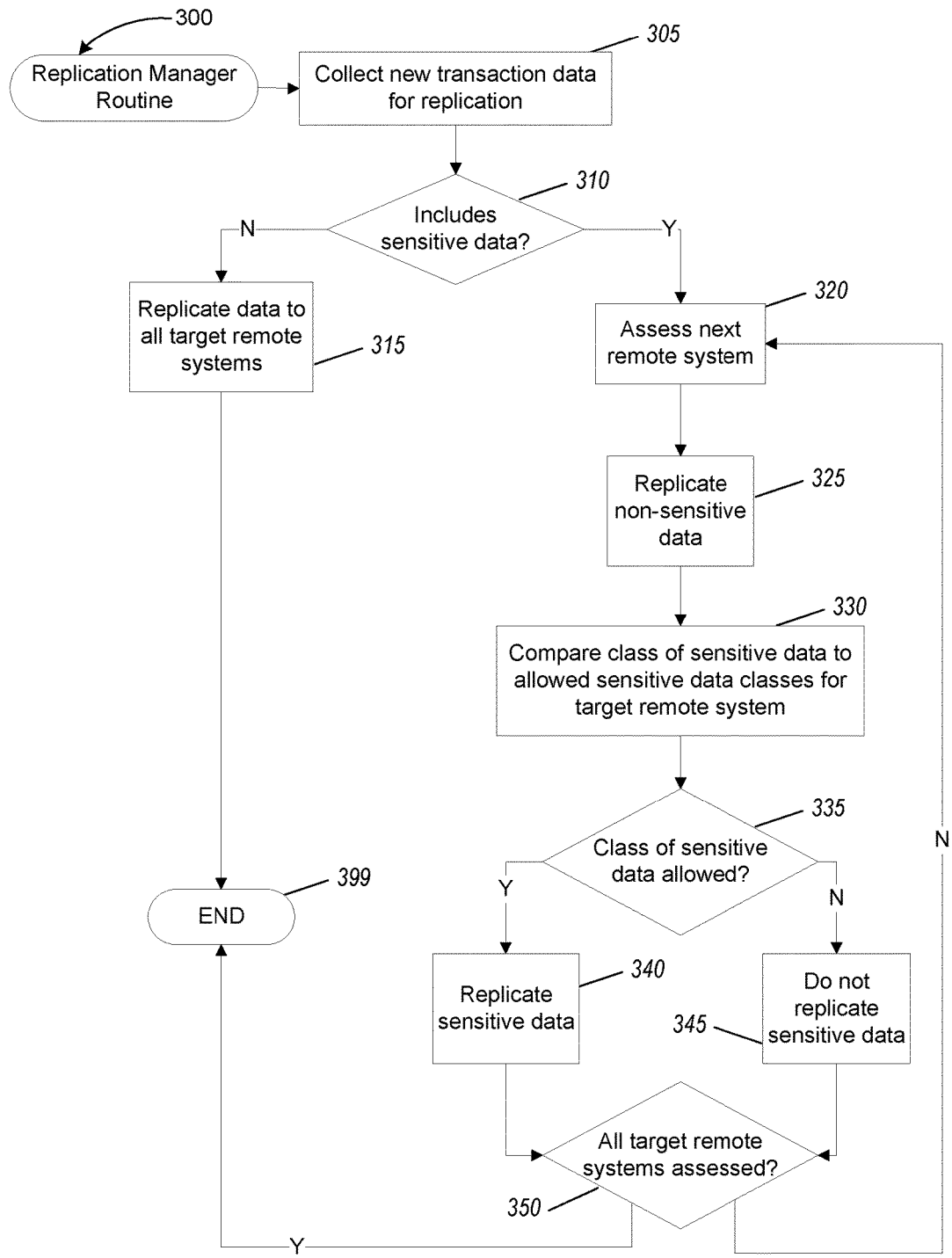
FIG. 3 depicts a process flow for data replication of sensitive data in a database in accordance with an embodiment of techniques described herein.

FIG. 3 depicts a process flow 300 for data replication of sensitive data in a database in accordance with an embodiment of techniques described herein, such as may be performed by (as one non-limiting example) replication manager module 114 of FIG. 1.

The routine begins at block 305, in which new transaction data for replication is collected. At block 310, the replication manager determines whether the new transaction data includes sensitive data, such as to determine whether the new transaction data includes record fields assigned one or more sensitive data classes or attributes.

If the new transaction data does not include sensitive data, the routine continues to block 315 and replicates the new transaction data to all target remote systems. If, however, it is determined that the new transaction data includes data having one or more sensitive data attributes, the routine proceeds to block 320 and assesses the first target remote data system.

The assessment of the target remote system includes block 325, in which the replication manager replicates any non-sensitive data included in the new transaction data. At block 330, the replication manager compares the class (or classes) of sensitive data identified in the new transaction data to those sensitive data classes for which replication is allowed with respect to the target remote system. At block 335, the replication manager determines whether the class of sensitive data identified in the new transaction data is allowed for replication to the target remote system. If so, the routine proceeds to block 340 and replicates the identified sensitive data. If not, the routine proceeds to block 345 and prevents replication of the sensitive data to the target remote system. In certain embodiments, preventing the replication of the sensitive data includes providing placeholder data in place of the sensitive data. For example, the replication manager may provide a series of 16 zeroes or other character in place of a 16-digit credit card number for a target remote system for which such sensitive financial data is not allowed for replication.

Regardless of whether the identified sensitive data was replicated, after block 340 or 345 the routine proceeds to block 350, in which the replication manager determines whether all target remote systems for potential replication of the new transaction data have been assessed. If not, the replication manager routine returns to block 320 to assess the next remote system as described above.

If it is determined in block 350 that all target remote systems have been assessed, or after block 315 in which all of the new transaction data has been replicated to all target remote systems, the routine proceeds to block 399 and ends. In at least some embodiments, ending of the routine may comprise awaiting an indication to return to block 305 to collect new transaction data for replication, such as an indication that additional transaction data is ready for collection.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving, by one or more computing systems configured to manage a database, an indication that one or more record fields in the database comprise sensitive data, wherein the one or more indicated record fields are a subset of a larger plurality of record fields in the database;
flagging, by the one or more configured computing systems and based at least in part on the received indication, the one or more indicated record fields; and
replicating, by the one or more configured computing systems, at least a portion of the database to multiple remote systems, wherein replicating the at least a portion of the database to the multiple remote systems includes:
for at least a first of the multiple remote systems, providing data associated with the larger plurality of record fields to the remote system;
for at least a second of the multiple remote systems and based at least in part on the flagging of the one or more indicated record fields, providing to the remote system data associated only with record fields other than a flagged subset; and
for at least the second remote system, providing placeholder data for the flagged subset of one or more indicated record fields to the second remote system.

2. The computer-implemented method of claim 1 wherein flagging the one or more indicated record fields includes associating one or more sensitive data attributes with each record field of the subset.

3. The computer-implemented method of claim 2 wherein at least one of the one or more sensitive data attributes is associated with one or more of a financial information record field and a contact information record field.

4. The computer-implemented method of claim 2 wherein associating the one or more sensitive data attributes with each record field of the subset includes associating multiple classes of sensitive data attributes with the subset of indicated record fields.

5. The computer-implemented method of claim 1 wherein the method further comprises receiving, for each of at least the second of the multiple remote systems, an indication not to provide data associated with the flagged subset of record fields to the remote system.

6. The computer-implemented method of claim 1 wherein receiving the indication that one or more record fields comprise sensitive data includes receiving one or more DFDL elements.

7. A non-transitory computer-readable medium having stored contents that, when executed, configure a computing system to:
receive an indication that one or more record fields in a database comprise sensitive data, wherein the one or more indicated record fields are a subset of a larger plurality of record fields in the database;
based at least in part on the received indication, flag the one or more indicated record fields; and
replicate at least a portion of the database to multiple remote systems, wherein replicating the at least a portion of the database to the multiple remote systems includes:
for at least a first of the multiple remote systems, providing data associated with the larger plurality of record fields to the remote system;
for at least a second of the multiple remote systems and based at least in part on the flagging of the one or more indicated record fields, providing to the remote system data associated only with record fields other than the flagged subset; and
for at least the second remote system, providing placeholder data for the flagged subset of one or more indicated record fields to the second remote system.

8. The non-transitory computer-readable medium of claim 7 wherein flagging the one or more indicated record fields includes associating one or more sensitive data attributes with each record field of the subset.

9. The non-transitory computer-readable medium of claim 8 wherein at least one of the one or more sensitive data attributes is associated with one or more of a financial information record field and a contact information record field.

10. The non-transitory computer-readable medium of claim 8 wherein associating the one or more sensitive data attributes with each record field of the subset includes associating multiple classes of sensitive data attributes with the subset of indicated record fields.

11. The non-transitory computer-readable medium of claim 7 wherein the stored contents further configure the computing system to receive, for each of at least the second of the multiple remote systems, an indication not to provide data associated with the flagged subset of record fields to the remote system.

12. The non-transitory computer-readable medium of claim 7 wherein receiving the indication that one or more record fields comprise sensitive data includes receiving one or more DFDL elements.

13. A system, comprising:
one or more processors; and
at least one memory, the memory including instructions that, upon execution by at least one of the one or more processors, cause the system to:
receive an indication that one or more record fields in a database comprise sensitive data, wherein the one or more indicated record fields are a subset of a larger plurality of record fields in the database;
based at least in part on the received indication, flag the one or more indicated record fields; and
replicate at least a portion of the database to multiple remote systems, wherein replicating the at least a portion of the database to the multiple remote systems includes:
for at least a first of the multiple remote systems, providing data associated with the larger plurality of record fields to the remote system;
for at least a second of the multiple remote systems and based at least in part on the flagging of the one or more indicated record fields, providing to the remote system data associated only with record fields other than the flagged subset; and
for at least the second remote system, providing placeholder data for the flagged subset of one or more indicated record fields to the second remote system.

14. The system of claim 13 wherein flagging the one or more indicated record fields includes associating one or more sensitive data attributes with each record field of the subset.

15. The system of claim 14 wherein at least one of the one or more sensitive data attributes is associated with one or more of a financial information record field and a contact information record field.

16. The system of claim 14 wherein associating the one or more sensitive data attributes with each record field of the subset includes associating multiple classes of sensitive data attributes with the subset of indicated record fields.

17. The system of claim 13 wherein the instructions further configure the system to receive, for each of at least the second of the multiple remote systems, an indication not to provide data associated with the flagged subset of record fields to the remote system.

\* \* \* \* \*